(12) United States Patent  
Liang (10) Patent No.: US 9,430,047 B2  
(45) Date of Patent: Aug. 30, 2016

(54) METHOD, DEVICE, AND SYSTEM OF CROSS-DEVICE DATA TRANSFER

(71) Applicant: UC Mobile Limited, Beijing (CN)

(72) Inventor: Jie Liang, Beijing (CN)

(73) Assignee: UC Mobile Limited, Beijing (CN)

( * ) Notice: Subject to any disclaimer, the term of this patent is extended or adjusted under 35 U.S.C. 154(b) by 14 days.

(21) Appl. No.: 14/303,475

(22) Filed: Jun. 12, 2014

(65) Prior Publication Data

US 2014/0292720 A1    Oct. 2, 2014

Related U.S. Application Data

(63) Continuation of application No. PCT/CN2012/085112, filed on Nov. 23, 2012.

(30) Foreign Application Priority Data

Dec. 15, 2011    (CN) .......................... 2011 1 0422516

(51) Int. Cl.
| | | |
|---|---|---|
| *G06F 3/01* | (2006.01) | |
| *H04L 29/08* | (2006.01) | |
| *G06F 3/0488* | (2013.01) | |
| *H04M 1/725* | (2006.01) | |
| *G06F 3/046* | (2006.01) | |
| *H04W 76/06* | (2009.01) | |

(52) U.S. Cl.
CPC ................ *G06F 3/017* (2013.01); *G06F 3/046* (2013.01); *G06F 3/0488* (2013.01); *H04L 67/06* (2013.01); *H04M 1/7253* (2013.01); *H04M 2250/22* (2013.01); *H04M 2250/64* (2013.01); *H04W 76/06* (2013.01)

(58) Field of Classification Search
None
See application file for complete search history.

(56) References Cited

U.S. PATENT DOCUMENTS

| | | | |
|---|---|---|---|
| 2007/0146347 | A1 | 6/2007 | Rosenberg |
| 2011/0081923 | A1 | 4/2011 | Forutanpour et al. |
| 2011/0163944 | A1* | 7/2011 | Bilbrey ................. G01D 21/02 345/156 |
| 2011/0175822 | A1* | 7/2011 | Poon ................... G06F 3/04842 345/173 |

FOREIGN PATENT DOCUMENTS

| | | | |
|---|---|---|---|
| CN | 101383813 | A | 3/2009 |
| CN | 101605138 | A | 12/2009 |
| CN | 102215041 | A | 10/2011 |
| CN | 102255639 | A | 11/2011 |
| CN | 102271179 | A | 12/2011 |
| CN | 102523346 | A | 6/2012 |
| WO | WO 2013/086930 | A1 | 6/2013 |

\* cited by examiner

*Primary Examiner* — Kenneth B Lee, Jr.
(74) *Attorney, Agent, or Firm* — Alston & Bird LLP (57) ABSTRACT

The disclosure provides a method and device for data transfer between electronic devices. The method comprises detecting a first induction signal generated based on a contact with a first touch screen of a first electronic device, determining a selection of data desired to be transferred to a second electronic device, determining a gesture associated with the first induction signal, generating a data transfer request in response to the determination of the gesture and the selection, communicating the data transfer request from the first electronic device to the second electronic device and transferring the selected data to the second electronic device.

16 Claims, 8 Drawing Sheets

METHOD, DEVICE, AND SYSTEM OF CROSS-DEVICE DATA TRANSFER

CROSS-REFERENCE TO RELATED APPLICATION

This application is a continuation of PCT/CN2012/085112, filed on Nov. 23, 2012, claiming priority of Chinese Application No. 201110422516.1, filed on Dec. 15, 2011, the entire contents each of which is incorporated herein by reference in their entireties.

TECHNICAL FIELD

The disclosure relates to the field of mobile communications, and more specifically, relates to a cross-device data transfer method, apparatus, device, and system.

BACKGROUND

One common method that users employ to transfer data between electronic devices is through the use of email. When a user desires to share data (e.g., photos or other files saved locally to a first device), the user may attach the data to an email, send the email with the attachment to the destination device, and then download the photos or files from the attachment onto the destination device. With development of wireless communications, more and more people use their electronic devices as a platform to wirelessly acquire or share information using wireless technology. For example, electronic devices frequently transfer data by technologies such as Near Field Communication (NFC), Wireless Fidelity (Wi-Fi), infrared technology, Bluetooth and General Packet Radio Service (GPRS) technology and/or the like.

BRIEF SUMMARY

Through applied effort, ingenuity, and innovation, solutions to improve methods, apparatus and mobile terminals have been realized and are described herein. Methods and mobile terminals are described herein that provide improved interfaces for data transfer between electronic devices. These interfaces may display a new application interface in response to receipt of one or more induction signals. Embodiments of the disclosure describe closing a present application interface and/or displaying a new application interface in response to receipt of one or more induction signals. Methods and mobile terminals are described herein that provide improved techniques for enter into thumbnail interface by applying a drag signal to a predetermined area.

According to one exemplary embodiment of the subject disclosure, a method for data transfer between electronic devices is described. The method comprises detecting a first induction signal generated based on a contact with a first touch screen of a first electronic device, determining a selection of data desired to be transferred to a second electronic device, determining a gesture associated with the first induction signal, generating a data transfer request in response to the determination of the gesture and the selection, communicating the data transfer request from the first electronic device to the second electronic device and transferring the selected data to the second electronic device.

According to one exemplary embodiment of the subject disclosure, a device to transfer data between electronic devices is described. The device comprises a processor configured to detect a first induction signal generated based on a contact with a first touch screen of a first electronic device, determine a selection of data desired to be transferred from the first electronic device to a second electronic device, activate a data transfer function in response to the determination of the selection, communicate the data transfer request from the first electronic device to the second electronic device and transfer the selected data to the second electronic device.

These characteristics as well as additional features, functions, and details of various embodiments are described below. Similarly, corresponding and additional embodiments are also described below.

BRIEF DESCRIPTION OF THE DRAWINGS

Having thus described some embodiments in general terms, reference will now be made to the accompanying drawings, which are not necessarily drawn to scale. The embodiments illustrated in the figures of the accompanying drawings herein are by way of example and not by way of limitation, and wherein:

DETAILED DESCRIPTION OF THE EMBODIMENTS

The subject disclosure now will be described more fully hereinafter with reference to the accompanying drawings, in which preferred embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. In this regard, reference may be made herein to a number of mathematical or numerical expressions or values, and to a number of positions of various components, elements or the like. It should be understood, however, that these expressions, values, positions or the like may refer to absolute or approximate expressions, values or positions, such that exemplary embodiments may account for variations that may occur in the multi-channel optical cell, such as those due to engineering tolerances. Like numbers refer to like elements throughout.

As used herein, the word "exemplary" is used herein to refer to serving as an example, instance, or illustration. Any aspect, feature, function, design, etc. described herein as "exemplary" or an "example" or "examples" is not necessarily to be construed as preferred or advantageous over other aspects, features, functions, designs, etc. Rather, use of the word exemplary is intended to present concepts in a concrete fashion. Data that is desired to be transferred from one electronic device to at least one of other electronic devices may be a folder comprising various types of files. The desired data may be one of various types of files, such as a text file, an image, a text, a URL, a video, an audio and/or the like.

Figure 1:
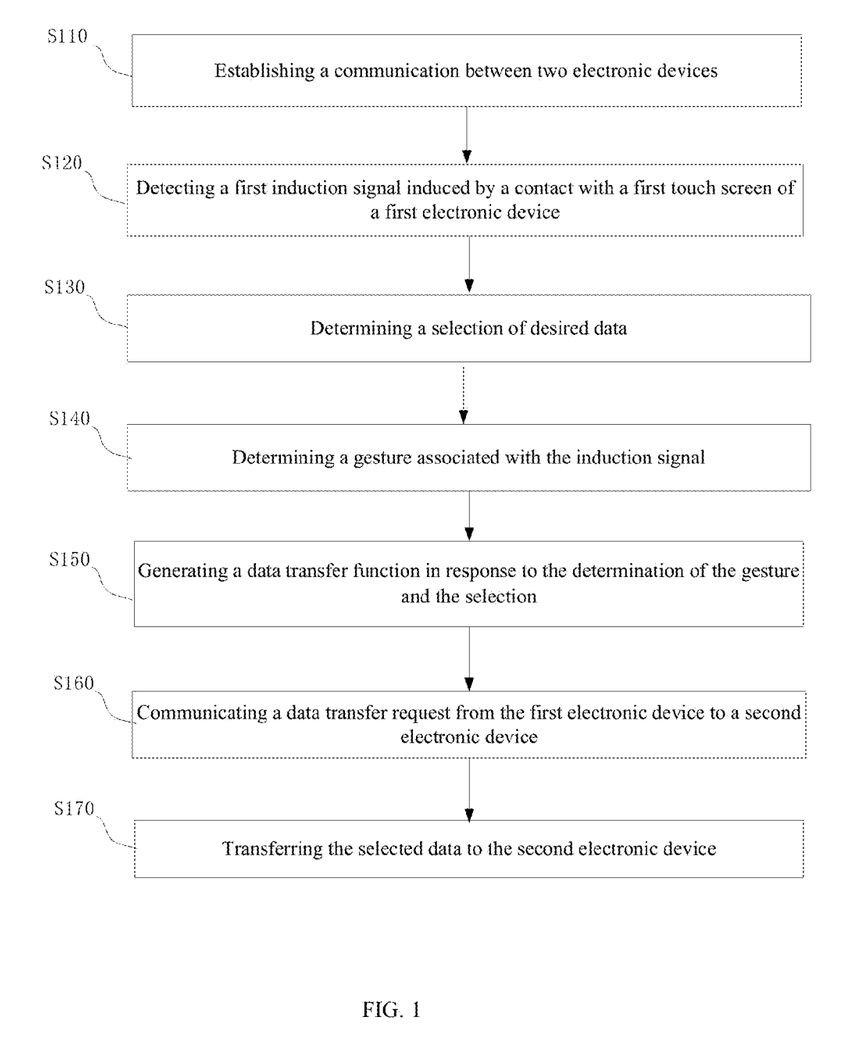
FIG. 1 is a flow chart illustrating a data transfer method between electronic devices in accordance with exemplary embodiments of the disclosure.

FIG. 1 is a flow chart illustrating a data transfer method between electronic devices in accordance with some exemplary embodiments of the disclosure ("exemplary" as used herein referring to "serving as an example, instance or illustration"). When a user desires to transfer data from a first electronic device to a second electronic device, a connection may be established between the first electronic device and the second electronic device at step S110. Many communication technologies may be used to support the data transfer between electronic devices, such as Near Field Communication (NFC), Wireless Fidelity (Wi-Fi), infrared technology, Bluetooth and General Packet Radio Service (GPRS) technology. The connection may be established between electronic devices that support similar communication technologies. The connection may also be possible between electronic devices that support different communication technologies. For example, the communication may be established between an NFC device and an unpowered NFC device. A point-to-point connection may be established using such as Bluetooth Technology for data transfer between electronic devices. The connection may be established by bringing the electronic devices into proximity with one another (e.g., within a threshold radius of one another or a particular location). The connection may also be established by activating a connection function implemented by software to enable the interaction between the electronic devices.

Upon establishment of the connection between the first electronic device and the second electronic device, a pointing object (e.g., a stylus or a user's finger(s)), may come into contact with a touch screen of the first electronic device. The contact may cause the touch screen to produce one or more induction signals. For brevity and convenience, the touch screen of the first electronic device may be defined as a first touch screen. The one or more induction signals may be sensed and detected by the first touch screen at step S120. A processor embedded in the first electronic device may determine the selection of the desired data at step S130 by one or more induction signals induced by a touch with the first touch screen. The processor of the first electronic device is defined as a first processor. The first processor may identify and determine which gesture is associated with the one or more induction signals at step S140. The gesture may, for example, comprise a single tap, a double-tap or a drag gesture. In some embodiments, if the first processor determines that the gesture is a drag gesture, the first processor may determine a direction in which the drag gesture is executed. For example, the user may tap the desired data, hold and drag the desired data outward to an edge of the first touch screen. The gesture comprising the tapping, holding, and dragging of the desired data outward to the edge of the first touch screen may be defined as a "drag-out" gesture. An example of such a "drag-out" gesture is described further below with respect to FIG. 2.

The first processor may then generate a data transfer request at step S150 based on the determined gesture and the selected data, and then send the data transfer request to a second electronic device at step S160. The first processor may transfer the selected data to the second electronic device at 170 in response to receiving a consent to receive generated by the second electronic device. For example, the user or another user may perform an input operation on the second electronic device to notify the first device of consent to receive the data. Alternatively, the second electronic device may be configured to automatically provide consent if certain conditions are met. For example, the second device may have be configured to accept incoming data transfers from particular users, from particular devices, from all users or devices, or the like.

The first electronic device may be configured to receive data transferred from other electronic devices as well. To indicate a consent to receive the data from another electronic device the user may provide a gesture input. For example, the user may tap on the touch screen and apply a drag gesture inward from an edge of the touch screen. A gesture comprising tap and drag inward from an edge of the touch screen may be defined as a "drag-in" gesture. An example of such a "drag-in" gesture is described further below with respect to FIG. 3.

Figure 2:
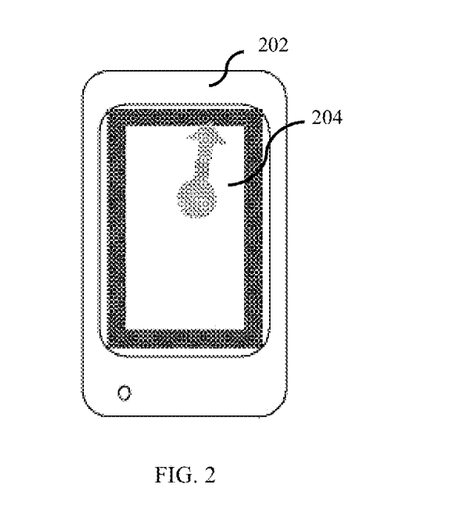
FIG. 2 is a schematic diagram illustrating a drag-out gesture in accordance with exemplary embodiments of the disclosure.

FIG. 2 illustrates an example of a drag-out gesture in accordance with some exemplary embodiments of the present disclosure. As shown in FIG. 2, the drag-out gesture may be applied outward to an edge 202 of a touch screen 204. The "tap," "hold" and "drag" the desired data may also indicate a selection of the data. In response to the determination of the drag-out gesture and the selection of the data, the first processor may determine that the user may desire to transfer the selected data to another electronic device.

Figure 3:
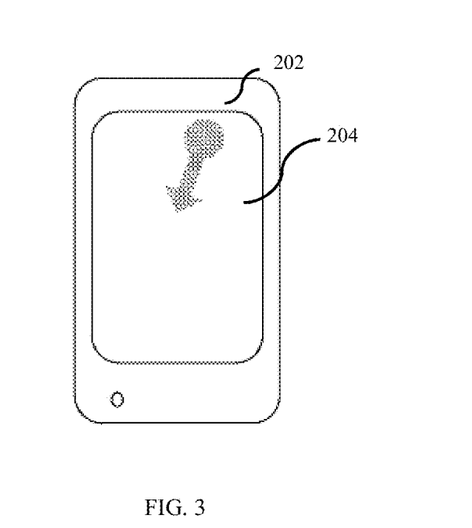
FIG. 3 is a schematic diagram illustrating a drag-in gesture in accordance with exemplary embodiments of the disclosure.

FIG. 3 illustrates an example of a drag-in gesture in accordance with some exemplary embodiments of the present disclosure. As shown in FIG. 3, the drag-in gesture may be applied inward from the edge 202 of the touch screen 204 toward a particular location on the touch screen (e.g., a center of the touch screen, an edge of the touch screen opposite the edge 202, or the like).

Figure 4:
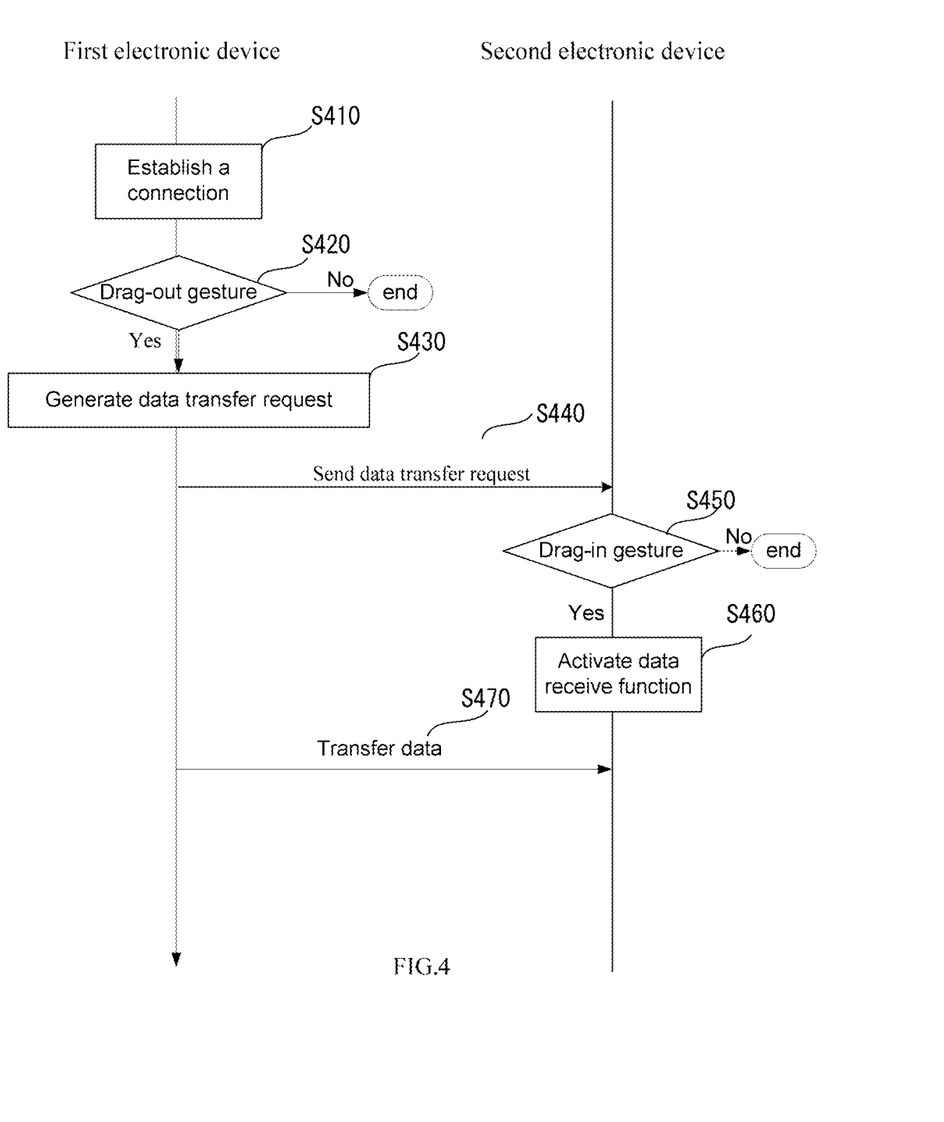
FIG. 4 is a communication chart illustrating a data transfer method between electronic devices in accordance with exemplary embodiments of the disclosure.

FIG. 4 is a signal diagram illustrating a data transfer method between a first electronic device and a second electronic device in accordance with some exemplary embodiments of the disclosure. A connection may be established between the first electronic device and the second electronic device at step S410. For example, the user may indicate a desire to transfer data via a particular gesture or other input to an interface of the first electronic device. Alternatively, it should be appreciated that additional or alternative criteria may be used to trigger initiation of the connection. For example, the connection may be established by bringing the first and second electronic devices into proximity with one another. The connection may also be established by activating a connection function implemented by software installed in the electronic devices to enable the interaction between the first and second electronic devices. Various communications technologies, including but not limited to Near Field Communication (NFC), Wireless Fidelity (Wi-Fi), infrared technology, Bluetooth and/or General Packet Radio Service (GPRS) technology may be used for establishing the connection. As described above with respect to FIG. 1 and FIG. 2, a drag-out gesture may be used to initiate a data transfer request. As such, when the first processor determines that a drag-out gesture is applied to data on the first touch screen at step S420, a data transfer request may be generated by the first processor at step S430. The first processor may then send the data transfer request to the second electronic device at step S440. If the gesture is not a drag-out gesture, the method may end.

The data transfer request may comprise contents of the data. The data transfer request may also comprise an authorization request to the second device requesting consent by the second electronic device to transfer the data to the second electronic device. The contents of the data and the authorization request may be displayed on the second electronic device. At the second electronic device, the touch screen, defined as the second touch screen, may sense and detect one or more induction signals induced by a gesture applied on the touch screen. The gesture may, for example, comprise a single tap, a double-tap or a drag gesture. As described above with respect to FIG. 1 and FIG. 3, a drag-in gesture may be employed to indicate consent to the data transfer request by the second electronic device. The second processor may determine if the gesture applied on the second touch screen is a drag-in gesture at step S450. In some embodiments, the second processor may determine if the drag-in gesture is applied within a predetermined period after the data transfer request is sent by the first electronic device. The predetermined period may, for example, be set from 5 seconds to 2 minutes. When the gesture applied on the second touch screen is determined to be a drag-in gesture and received within the predetermined period, the second processor may activate a data receive function on the second electronic device at step S460 to indicate consent to receive data transferred from the first electronic device. Then data will be transferred from the first electronic device to the second electronic device at step S470. If the gesture applied to the second touch screen is not a drag-in gesture at step S450, the method may end.

Figure 5A:
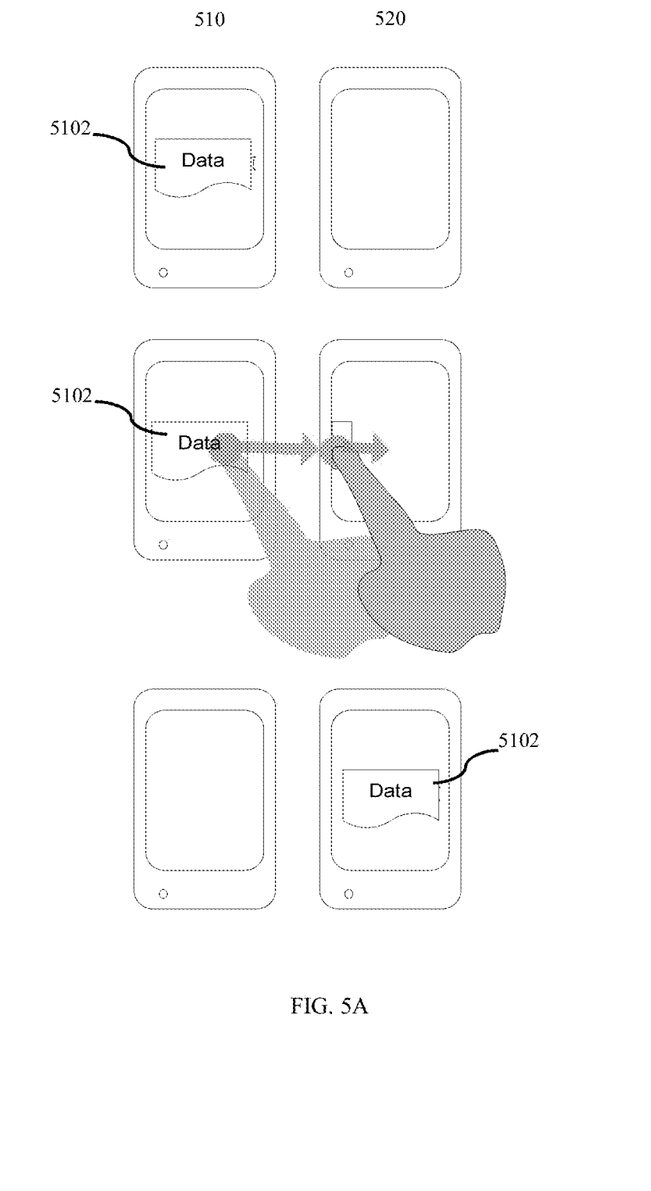
FIG. 5A is a schematic diagram illustrating a data transfer between two electronic devices in accordance with exemplary embodiments of the disclosure.
Figure 5B:
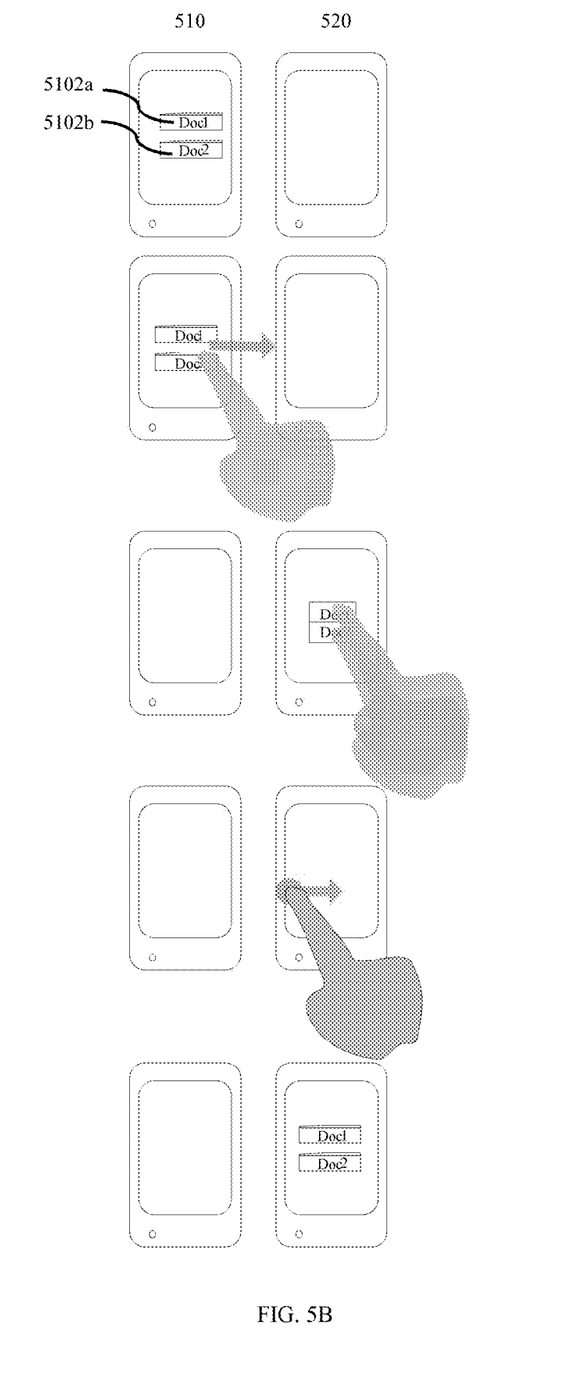
FIG. 5B is a schematic diagram illustrating data transfer between two electronic devices in accordance with exemplary embodiments of the disclosure.

FIG. 5A is a schematic diagram illustrating a data transfer between two electronic devices in accordance with some exemplary embodiments of the disclosure. In FIG. 5A, data 5102 is desired to be transferred from a first electronic device 510 to a second electronic device 520. A user's finger may apply a drag-out gesture to the data 5102 on the first electronic device 510 and then apply a drag-in gesture on the second electronic device 520. It should be appreciated that the drag-out gesture and the drag-in gesture may be employed as two separate gestures, and that the relative directions of the gestures may be determined with respect to the respective associated electronic devices. The data 5102 may then be displayed on a touch screen of the second electronic device 520. In some embodiments, the data 5102 may comprise one file. In some embodiments, the data may comprise two or more files. For example, as illustrated in FIG. 5B, the data may comprise two files. User may apply a drag-out gesture to documents 5102a and 5102b. The processor of the second electronic device 520 may select one of the documents 5102a and 5102b or select both of them and then apply a drag-in gesture on touch screen of the second electronic device 520.

Figure 6:
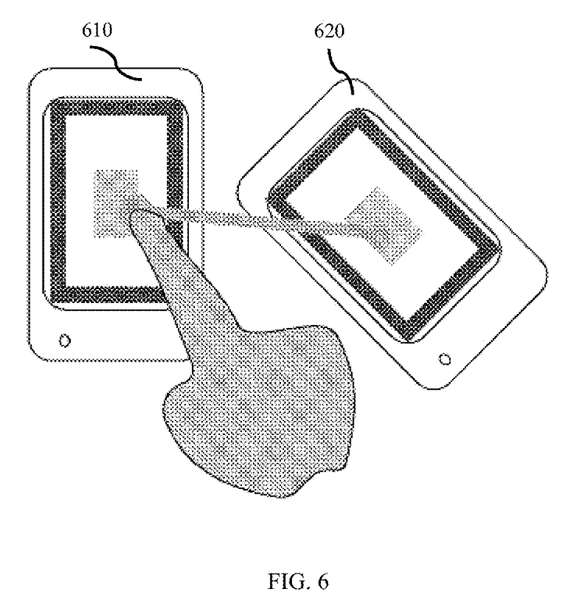
FIG. 6 is a schematic diagram illustrating data transfer between two electronic devices in accordance with exemplary embodiments of the disclosure.

In some embodiments, communication may be established between electronic devices by bringing them into proximity or by touching them together. The second electronic device may be placed in any direction relative to the positioning of the first electronic device. FIG. 6 shows an exemplary embodiment that a first electronic device 610 is in proximity of a second electronic device 620 in accordance with some embodiments of the present invention.

Figure 7:
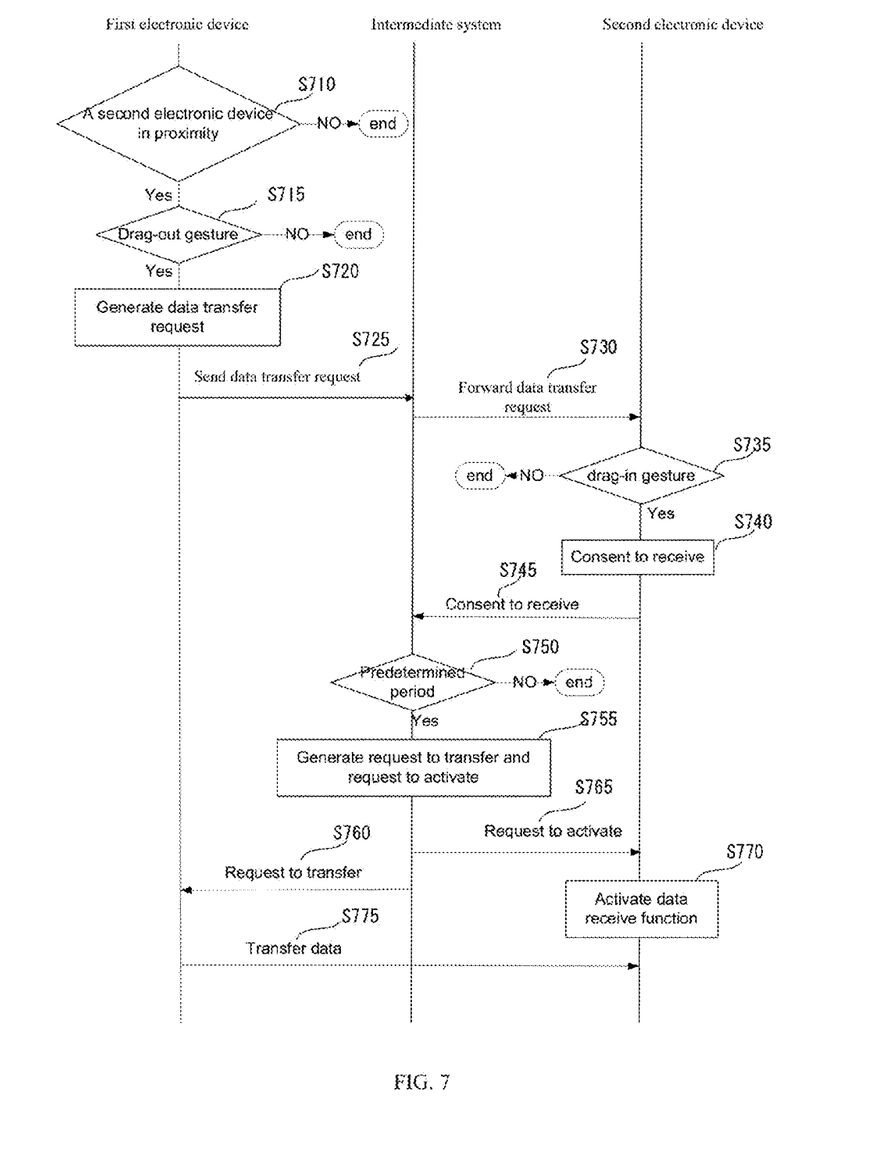
FIG. 7 is a signalling diagram illustrating a data transfer method between electronic devices in accordance with exemplary embodiments of the disclosure.

FIG. 7 is a signalling diagram illustrating a data transfer method between the first electronic device and the second electronic device using an intermediate system in accordance with some exemplary embodiments of the disclosure. In some embodiments, the data may be transferred between the electronic devices via an intermediate system. As specific, non-limiting examples, Near Field Communication (NFC), Wireless Fidelity (Wi-Fi), infrared technology, Bluetooth or General Packet Radio Service (GPRS) technology may be used to establish the connection. At step S710, the first electronic device may search and determine if another electronic device is in proximity and available to connect to the first electronic device. If the result obtained at step S710 is Yes, the first electronic device may enable interaction between the first electronic device and the second electronic device. The first electronic device may detect a gesture applied on the first touch screen, and determine if the gesture is a drag-out gesture at step S715. When the first processor determines a drag-out gesture is applied to data on the first touch screen at step S715, a data transfer request may be generated by the first electronic device at step S720. The first electronic device may then send the data transfer request to the intermediate system at step S725. If the gesture is not a drag-out gesture, the method may end. The data transfer request may comprise contents of the data. The data transfer request may also comprise an authorization request to the second device requesting consent by the second electronic device to transfer the data to the second electronic device. The contents and the authorization request may also be displayed on the second electronic device. The data may comprise one or more files.

The intermediate system may forward the data transfer request to the second electronic device at step S730. At the second electronic device, the second touch screen may sense and detect one or more induction signals induced by a gesture applied to the second touch screen. For example, the gesture may comprise a single tap, double-tap or a drag gesture. The second electronic device may determine if the gesture applied on the second touch screen is a drag-in gesture at step S735. In response to determining that the gesture is a drag-in gesture, at step S740 the second electronic device may generate a notification indicating consent to receive data from the first electronic device. The notification may also comprise a selection of the data when the data comprises two or more files. For example, the direction and/or size of the drag-in gesture may select a particular subset of the data (e.g., one or more particular files) for the transfer. If the gesture is not a drag-in gesture, the method may end.

The second electronic device may send the notification indicating consent to receive data to the intermediate system at step S745. The intermediate system may determine if notification indicating consent to receive the data was received within a predetermined period after the data transfer request is sent by the first electronic device at step S750. If the notification indicating consent was not received during the predetermined period, a time-out response may be generated and the method may proceed to the end. If the notification indicating consent was received during the predetermined period, the intermediate system may generate a request to transfer r the first electronic device and a request to activate a data receive function for the second electronic device at step S755. The request to transfer may request the first electronic device to send the data. The request to activate may request the second electronic device to activate data reception functionality of the second electronic device to receive the data transferred from the first electronic device. The intermediate system may then send the request to transfer to the first electronic device at step S760 and send the request to activate the data receive function to the second electronic device at step S765. The request to transfer to the first electronic device may also be sent after the request to activate to the second electronic device is sent. The request to transfer and the request to activate may also be sent simultaneously. In some embodiments, the intermediate system may not generate a request to transfer at step S755. In other words, only the request to activate may be generated at step S755. Upon receipt of the request to activate at step S765, the second electronic device may activate data reception functions at step S770.

A communication channel may be established between the first and second electronic devices to facilitate transfer of the data. The first electronic device may then transfer the data to the second electronic device through the communication channel at step S775.

Figure 8:
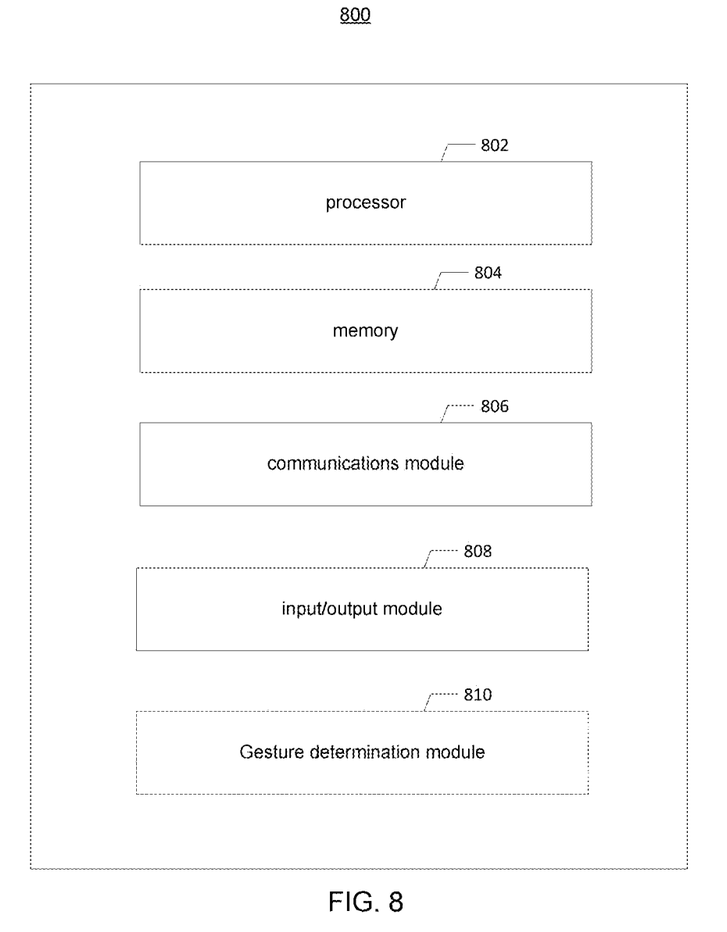
FIG. 8 illustrates a schematic diagram of example circuitry in accordance with exemplary embodiments of the disclosure.

FIG. 8 shows a schematic block diagram of example circuitry 800, some or all of which may be included in the electronic device in accordance with some exemplary embodiments of the present disclosure. The circuitry 800 may include various elements, such as one or more processors 802, memories 804, communications modules 806, input/output modules 808, and/or a gesture determination module 810. Exemplary embodiments of the invention as described above with respect to FIGS. 1-7 may employ the circuitry 800 to execute and perform various aspects of the disclosure. For example, the circuitry 800 may function as a first electronic device transmitting data, a second electronic device receiving data, or an intermediate device managing the transfer of data between a first electronic device and a second electronic device.

As referred to herein, "module" includes hardware, software, and/or firmware configured to perform one or more particular functions. In this regard, the circuitry as described herein may be embodied as one or more means for performing various functional aspects of the present disclosure, including, for example, circuitry, hardware elements (e.g., a suitably programmed processor, combinational logic circuit, integrated circuit, and/or the like) or various combinations thereof. Some embodiments include a computer program product comprising computer-readable program instructions stored on a non-transitory computer-readable medium (e.g., memory 804) that is executable by a suitably configured processing device (e.g., processor 802).

Processor 802 may, for example, be embodied as various means for processing including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Processor 802 may comprise a plurality of means for processing. The plurality of means for processing may be embodied on a single computing device or may be distributed across a plurality of computing devices collectively configured to function as circuitry 800. The plurality of means for processing may be in operative communication with each other and may be collectively configured to perform one or more functionalities of circuitry 800 as described herein. In an example embodiment, processor 802 may be configured to execute instructions stored in memory 804 or otherwise accessible to processor 802. These instructions, when executed by processor 802, may cause circuitry 800 to perform one or more of the functions described herein, such as the processes described with respect to FIGS. 1-7.

Whether configured by hardware, firmware/software methods, or by a combination thereof, processor 802 may comprise an entity capable of performing operations according to embodiments of the present disclosure while configured accordingly. Thus, for example, when processor 802 is embodied as an ASIC, FPGA, or the like, processor 802 may comprise specifically configured hardware for conducting one or more operations described herein. As another example, when processor 802 may be embodied as an executor of instructions, such as may be stored in memory 804, the instructions may specifically configure processor 802 to perform one or more algorithms, methods, operations, or functions described herein. For example, processor 802 may be configured to determine if an electronic device consents to receive data transfer from another electronic device.

Memory 804 may comprise, for example, volatile memory, non-volatile memory, or some combination thereof. Although illustrated in FIG. 8 as a single memory, memory 804 may comprise a plurality of memory components. The plurality of memory components may be embodied on a single computing component or distributed across a plurality of computing components. In various embodiments, memory 804 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 804 may be configured to store information, data, applications, instructions, or the like for enabling circuitry 800 to carry out various functions in accordance with example embodiments discussed herein. For example, in at least some embodiments, memory 804 may be configured to buffer input data for processing by processor 802. Additionally or alternatively, in at least some embodiments, memory 804 may be configured to store program instructions for execution by processor 802 and/or data for processing by processor 802. Memory 804 may store information in the form of static and/or dynamic information. This stored information may be stored and/or used by circuitry 800 during the course of performing its functionalities.

Communications module 806 may be embodied as any component or means for communication embodied in circuitry, hardware, a computer program product comprising computer readable program instructions stored on a computer readable medium (e.g., memory 804) and executed by a processing device (e.g., processor 802), or a combination thereof that is configured to receive and/or transmit data from/to another device, such as, for example, a second circuitry 800 and/or the like. In some embodiments, communications module 806 (like other components discussed herein) can be at least partially embodied as or otherwise controlled by processor 802. In this regard, communications module 806 may be in communication with processor 802, such as via a bus. Communications module 806 may include, for example, an antenna, a transmitter, a receiver, a transceiver, network interface card and/or supporting hardware, and/or firmware/software for enabling communications. Communications module 806 may be configured to receive and/or transmit any data that may be stored by memory 804 using any protocol that may be used for communications. Communications module 806 may additionally and/or alternatively be in communication with the memory 804, input/output module 808, and/or any other component of circuitry 800, such as via a bus. Communications module 806 may be configured to use one or more communications protocols such as, for example, short messaging service (SMS), Wi-Fi (e.g., a 802.11 protocol, Bluetooth, etc.), radio frequency systems (e.g., 900 MHz, 1.4 GHz, and 5.6 GHz communication systems), infrared, GSM, GSM plus EDGE, CDMA, quadband, and other cellular protocols, VOIP, or any other suitable protocol.

Input/output module 808 may be in communication with processor 802 to receive an indication of an input and/or to provide an audible, visual, mechanical, or other output. In that sense, input/output module 808 may include means for implementing analog-to-digital and/or digital-to-analog data conversions. Input/output module 808 may include support, for example, for a display, touch screen, keyboard, button, click wheel, mouse, joystick, an image capturing device, microphone, speaker, biometric scanner, and/or other input/output mechanisms. In embodiments where circuitry 800 may be implemented as a server or database, aspects of input/output module 808 may be reduced as compared to embodiments where circuitry 800 may be implemented as an end-user machine or other type of device designed for complex user interactions. In some embodiments (like other components discussed herein), input/output module 808 may even be eliminated from circuitry 800. Alternatively, such as in embodiments wherein circuitry 800 is embodied as a server or database, at least some aspects of input/output module 808 may be embodied on an apparatus used by a user that is in communication with circuitry 800. Input/output module 808 may be in communication with memory 804, communications module 806, and/or any other component(s), such as via a bus. Although more than one input/output module and/or other component can be included in circuitry 800, only one is shown in FIG. 8 to avoid overcomplicating the disclosure (e.g., like the other components discussed herein).

In some embodiments, gesture determination module 810 may also or instead be included and configured to perform the elements of the functionality discussed herein related to identifying and processing gesture inputs received as part of the data transfer process. In some embodiments, some or all of the functionality of gesture determination module 810 may be performed by processor 802. In this regard, the example processes discussed herein can be performed by at least one processor 802 and/or gesture determination module 810. For example, non-transitory computer readable storage media can be configured to store firmware, one or more application programs, and/or other software, which include instructions and other computer-readable program code portions that can be executed to control processors of the components of circuitry 800 to implement various operations, including the examples shown herein. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor, and/or other programmable apparatus's circuitry to produce a machine, such that the computer, processor, or other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various forms, including entirely of hardware or any combination of software and hardware. Furthermore, embodiments may take the form of a computer program product on at least one non-transitory computer readable storage medium having computer readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to components, such as functional modules, system components, and circuitry. Below is a discussion of an example process flow chart describing functionality that may be implemented by one or more components and/or means discussed above and/or other suitably configured circuitry.

According some aspects of the subject disclosure, the first electronic device, the second electronic device, and/or the intermediate device may operate under control of a computer program. The computer program for performing the methods of exemplary embodiments of the disclosure may include one or more computer-readable program code portions, such as a series of computer instructions, embodied or otherwise stored in a computer-readable storage medium, such as the non-volatile storage medium.

FIGS. 1, 4, and 7 are flow charts reflecting processes and control of methods, systems, and computer programs according to exemplary embodiments of the disclosure. It will be understood that each block or step of the flow chart, and combinations of blocks or steps in the flow chart, may be implemented by various means, such as hardware alone or in combination with firmware, and/or software including one or more computer program instructions. As will be appreciated, any such computer program instructions may be loaded onto a computer, special purpose computer, or other programmable data processing apparatus, such as processor 802, to produce a machine, or machines, such that the computer program product includes the instructions which execute on the computer or other programmable data processing apparatus (e.g., hardware) to create means for implementing the functions described herein, such as the functions specified in the block(s) or step(s) of the flow charts of FIGS. 1, 4, and 7.

These computer program instructions may also be stored in a computer-readable storage device (e.g., memory 804) that may direct a computer or other programmable data processing apparatus to function in a particular manner, such that the instructions stored in the computer-readable storage device produce an article of manufacture including instruction computer-readable instructions for implementing the functions described herein, such as the functions specified in the block(s) or step(s) of the flow charts of FIGS. 1, 4, and 7. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions described herein, such as the functions specified in the block(s) or step(s) of the flow charts of FIGS. 1, 4, and 7.

Accordingly, blocks or steps of the flow chart support means and combinations of means for performing and/or implementing the specified functions, combinations of steps for performing and/or implementing the specified functions and program instruction means for performing and/or implementing the specified functions. It will also be understood that one or more blocks or steps of the flow chart, and combinations of blocks or steps in the flow chart, may be implemented by special purpose hardware-based computer systems which perform the specified functions or steps, or combinations of special purpose hardware and computer instructions.

It will be appreciated by those skilled in the art that changes could be made to the examples described above without departing from the broad inventive concept. It is understood, therefore, that this disclosure is not limited to the particular examples disclosed, but it is intended to cover modifications within the spirit and scope of the disclosure as defined by the appended claims. Although specific terms are employed herein, they are used in a generic and descriptive sense only and not for purposes of limitation.

Although various embodiments of the present invention have been described with reference to the figures, those skilled in the art should understand that various improvements may also be occur to various embodiments mentioned by the present invention without departing from the summary of the present invention. Therefore, the scope of protection of the present invention should be determined by the contents of the appended claims.

Obviously, those skilled in the art should understand that each module or each step of the present invention may be implemented by a general purpose computing device, they may be focused on a single computing device, or may be distributed on the network composed of multiple computing devices. Optionally, they may be implemented by a computing device executable program code, so that they are stored in a storage device for execution by the computing device, or may be implemented by making them into various integrated circuit module respectively, or making multiple modules or steps among them into a single integrated circuit module. In this way, the present invention will not limit the combination of any specific hardware and software.

The above is only the preferred embodiment of the present invention, and not limited to the present invention. For those skilled in the art, the present invention may have various alterations and changes. Any modification, equivalent replacement, improvement and so on within the spirit and principle of the present invention should be contained within the scope of protection of the present invention.

What is claimed is:

1. A method for data transfer between electronic devices each of which has a touch screen, comprising:
   detecting a first induction signal generated based on a contact with a first touch screen of a first electronic device;
   determining a selection of data desired to be transferred to a second electronic device;
   determining a gesture associated with the first induction signal;
   generating a data transfer request in response to the determination of the gesture and the selection;
   communicating the data transfer request from the first electronic device to the second electronic device, wherein the data transfer request causes the second electronic device to activate a data reception function in response to receipt of a second induction signal on a second touch screen coupled to the second electronic device within a predetermined period after the data transfer request is sent by the first electronic device, and wherein the second induction signal comprises a drag-in gesture including a touch executed on the second touch screen at a displayed object representing the selected data and a subsequent drag of the displayed object executed inward from an edge of the second touch screen; and
   transferring the selected data to the second electronic device.

2. The method of claim 1, further comprising determining a direction in which the gesture is executed.

3. The method of claim 2, further comprising determining the gesture comprises a drag-out gesture including a second touch executed on the first touch screen at the displayed object representing the selected data and a subsequent drag of the displayed object outward to an edge of the first touch screen.

4. The method of claim 1, further comprising establishing communication between the first electronic device and the second electronic device, wherein the communication occurs via at least one of Near Field Communication (NFC), Wireless Fidelity (Wi-Fi), infrared technology, Bluetooth and General Packet Radio Service (GPRS) technology.

5. The method of claim 1, further comprising establishing a point-to-point communication channel between the first electronic device and the second electronic device, wherein the data is transferred from the first electronic device to the second electronic device via the point-to-point communication channel.

6. The method of claim 1, further comprising sending the data transfer request to the second electronic device via an intermediate system.

7. The method of claim 6, further comprising receiving from the intermediate system a request to transfer within a predetermined period after the intermediate system receives from the second electronic device a notification indicating consent to receive, wherein the notification indicating consent to receive is generated in response to receipt of a second induction signal on a second touch screen of the second electronic device.

8. The method of claim 7, further comprising transferring data to the second electronic device after a data receive function of the second electronic device is activated by a request to activate, wherein the request to activate is generated by the intermediate system.

9. A device to transfer data between electronic devices each of which has a touch screen, comprising a processor configured to:
   detect a first induction signal generated based on a contact with a first touch screen of a first electronic device;
   determine a selection of data desired to be transferred from the first electronic device to a second electronic device;
   activate a data transfer function in response to the determination of the selection;
   communicate the data transfer request from the first electronic device to the second electronic device, wherein the data transfer request causes the second electronic device to activate a data reception function in response to receipt of a second induction signal on a second touch screen coupled to the second electronic device within a predetermined period after the data transfer request is sent by the first electronic device, and wherein the second induction signal comprises a drag-in gesture including a touch executed on the second touch screen at a displayed object representing the selected data and a subsequent drag of the displayed object executed inward from an edge of the second touch screen; and
   transfer the selected data to the second electronic device.

10. The device of claim 9, wherein the processor is further configured to identify a gesture associated with the first induction signal and determine a direction in which the gesture is executed.

11. The device of claim 10, wherein the processor is further configured to determine the gesture comprises a drag-out gesture including a second touch executed on the first touch screen at the displayed object representing the selected data and a subsequent drag of the displayed object outward to an edge of the first touch screen of the first electronic device.

12. The device of claim 9, the processor is further configured to establish communication between the first electronic device and the second electronic device, wherein the communication occurs via at least one of Near Field Communication (NFC), Wireless Fidelity (Wi-Fi), infrared technology, Bluetooth and General Packet Radio Service (GPRS) technology.

13. The device of claim 9, wherein the processor is further configured to communicate the data transfer request to the second electronic device via an intermediate system.

14. The device of claim 13, wherein the processor is further configured to receive from the intermediate system a request to transfer within a predetermined period after the intermediate system receives from the second electronic device a notification indicating consent to receive, wherein the notification indicating consent to receive is generated in response to receipt of a second induction signal on a second touch screen of the second electronic device.

15. The device of claim 14, wherein the processor is further configured to transfer data to the second electronic device after a data receive function of the second electronic device is activated by a request to activate, wherein the request to activate is generated by the intermediate system.

16. A computer program product comprising a non-transitory computer readable storage medium and computer program instructions stored therein, the computer program instructions comprising program instructions that are executed by a processor, the processor configured to:

detect a first induction signal induced by a contact with a first touch screen of a first electronic device;

determine a selection of data desired to be transferred to a second electronic device;

activate a data transfer function in response to the determination of the selection;

communicate a data transfer request from the first electronic device to the second electronic device, wherein the data transfer request causes the second electronic device to activate a data reception function in response to receipt of a second induction signal on a second touch screen coupled to the second electronic device within a predetermined period after the data transfer request is sent by the first electronic device, and wherein the second induction signal comprises a drag-in gesture including a touch executed on the second touch screen at a displayed object representing the selected data and a subsequent drag of the displayed object executed inward from an edge of the second touch screen; and transfer the selected data to the second electronic device.

* * * * *